(12) United States Patent
Hou et al.

(10) Patent No.: US 11,555,936 B2
(45) Date of Patent: Jan. 17, 2023

(54) ANALYTICS AND MACHINE LEARNING METHOD FOR ESTIMATING PETROPHYSICAL PROPERTY VALUES

(71) Applicant: CGG SERVICES SAS, Massy (FR)

(72) Inventors: Song Hou, Crawley (GB); Stefano Angio, Croydon (GB); Henning Hoeber, Keltneyburn (GB)

(73) Assignee: CGG SERVICES SAS, Massy (FR)

( * ) Notice: Subject to any disclaimer, the term of this patent is extended or adjusted under 35 U.S.C. 154(b) by 189 days.

(21) Appl. No.: 16/738,025

(22) Filed: Jan. 9, 2020

(65) Prior Publication Data

US 2020/0379135 A1 Dec. 3, 2020

Related U.S. Application Data

(60) Provisional application No. 62/853,780, filed on May 29, 2019.

(51) Int. Cl.
*G06N 3/04* (2006.01)
*G01V 1/28* (2006.01)
*G01V 1/30* (2006.01)
*G06N 3/08* (2006.01)

(52) U.S. Cl.
CPC ............ *G01V 1/282* (2013.01); *G01V 1/284* (2013.01); *G01V 1/303* (2013.01); *G06N 3/04* (2013.01); *G06N 3/08* (2013.01)

(58) Field of Classification Search
CPC ........ G01V 1/282; G01V 1/284; G01V 1/303; G01V 2210/614; G06N 3/04; G06N 3/08
See application file for complete search history.

(56) References Cited

PUBLICATIONS

Alyousuf et al., Near-Surface Velocity Analysis for Single Sensor Data: An Integrated Workflow Using Surface Waves, AI and Structure-Regularized Inversion, 2018 SEG International Exposition and 88th Annual Meeting, pp. 2342-2346 (Year: 2018).*
Johnson et al., Advanced Imaging and Inversion for Oil Production Estimates in Unconventional Resource Plays, 2013 SEG, Houston 2013 Annual Meeting, pp. 3159-3163 (Year: 2013).*
F. A. Schwab et al., "Fast Surface Wave and Free Mode Computations," Institute of Geophysics and Planetary Physics, University of California, 1972, pp. 87-180.
Jianghai Xia et al., "Estimation of near-surface shear-wave velocity by inversion of Rayleigh waves," Geophysics, 1999, pp. 691-700, vol. 64, No. 3.
Laura Valentina Socco et al., "Surface-wave analysis for building near-surface velocity models—Established approaches and new perspectives," Geophysics, 2010, pp. 75A83-75A102, vol. 75, No. 5.
S. Hou et al., "Multi-modal Surface Wave Inversion and Application to North Sea OBN Data," Th LHR5 08, 78th EAGE Conference & Exhibition 2016, Vienna, Austria, May 30-Jun. 2, 2016, 5 pages.

* cited by examiner

*Primary Examiner* — Toan M Le
(74) *Attorney, Agent, or Firm* — Patent Portfolio Builders PLLC

(57) ABSTRACT

Property values inside an explored underground subsurface are determined using hybrid analytic and machine learning. A training dataset representing survey data acquired over the explored underground structure is used to obtain labels via an analytic inversion. A deep neural network model generated using the training dataset and the labels is used to predict property values corresponding to the survey data using the DNN model.

18 Claims, 6 Drawing Sheets

900

ANALYTICS AND MACHINE LEARNING METHOD FOR ESTIMATING PETROPHYSICAL PROPERTY VALUES

BACKGROUND

Technical Field

Embodiments of the subject matter disclosed herein generally relate to methods and devices using analytic and machine learning for estimating petrophysical property values; more particularly, an analytic inversion is used to determine a training dataset, and a deep neural network (DNN) is used in a machine learning paradigm to enable inferring property values throughout an explored underground structure.

Discussion of the Background

Seismic exploration detects and processes seismic data representing acoustic waves emerging from an underground geophysical structure (which may be beneath the water bottom) to generate a profile (image) of an explored underground geophysical structure. This profile may be used to assess the likelihood that oil and gas or other natural resources are present in the structure, and further to determine drilling paths, risks, presence of aquifers, etc. Various property values such as the wave-propagation velocity inside the structure may be obtained from the seismic data via analytic inversion methods.

As an example of an analytic inversion, surface-wave inversion (SWI) methods estimate high-resolution shallow shear-wave velocity models from dispersion curves of surface waves (as described, for example, in Xia et al.'s article, "Estimation of near-surface shear-wave velocity by inversion of Rayleigh wave," published in 1999 in *Geophysics* Vol. 64, No. 3, pp. 691-700; Sacco et al.'s article, "Surface-wave analysis for building near-surface velocity models—Established approaches and new perspectives" published in 2010 in *Geophysics* Vol. 75, No. 5, pp. 75A83-75A102; or Hou et al.'s article, "Multi-modal Surface Wave Inversion and Application to North Sea OBN Data," published in 78th EAGE Conference and Exhibition, Vienna 2016, Extended Abstracts). SWI includes two steps: (1) dispersion curve picking after spectral analysis of the surface waves, and (2) dispersion curve inversion for near surface shear-wave velocity $v_s$. The inversion at each location gives a spatial volume of 1D shear-wave velocity profiles, which are combined into a three-dimensional (3D) shallow $v_s$ model. This model is employed in drilling operations and shallow gas detection and is also used in other elements of seismic processing, for example (but not limited to) for static corrections and velocity model building for depth migration. Because it is difficult to obtain well-sampled 3D $v_s$ information from other measurements, SWI is important within seismic processing technology.

SWI is a non-linear inverse problem and is conventionally solved with analytic inversion methods (i.e., stochastic optimization, such as Monte-Carlo, simulated annealing and genetic algorithms). Estimating a 1D velocity model requires exploring the model space with a large number of forward models of dispersion curves. For large-scale SWI problems, this is a computationally intensive task because the iterative inversions have to be done at each spatial grid, repeatedly. The sensitivity of the analytic inversion is "local" (i.e., it sees a single inversion at a time) which does not allow the analytic inversion to "see" the noise distribution. Noisy areas will lead to noisy inversions.

SWI serves as an example of an analytic inversion method, in which the relation between unknown and sought model parameters m is given by an a priori known function f(m,d) that relates the mode parameters to the data d. An analytic inversion (of any kind), finds an optimal model m̂ by algorithmically minimizing a misfit function (of any kind) $L=\|f(\hat{m}, d)\|$. More general than just in case of SWI, the input data d, can be various kinds of measurement from seismic such as seismic data itself (at any stage of the processing), including seismic data transformed to other domains, such as (but not exclusively) frequency spectrum of seismic data, FK spectrum of seismic data, FV spectrum of seismic data, dispersion curves picked from FK or FV spectrum. Model parameters m are earth properties, such as, Vp, Vs, density, lithology, facies, porosity and permeability.

There is a need to further develop computationally efficient methods, more robust to noise and independent of noise distribution to accurately determine property values inside an explored underground structure.

SUMMARY

The various embodiments implement a hybrid approach (with analytic and machine learning (ML) steps) for determining property values inside an explored underground structure. For example, a deep neural network (DNN) is trained using a sparse grid (or a subset thereof) of 1D velocity models obtained by the analytic solutions to SWI on a subset of the data. The DNN is then used to predict property (e.g., shear-wave velocity) values for the entire underground geophysical structure. In comparison to the purely analytical approach, this hybrid analytic-ML approach better (e.g., more robust with respect to noise) estimates the property (such as shear-wave velocity) values throughout the underground structure with a significant reduction in computational effort, and an improved signal to noise of the resulting data.

According to an embodiment, there is a method for determining property values inside an explored underground structure. The method includes generating a training dataset representing survey data acquired over the explored underground structure, obtaining labels corresponding to the training dataset via an analytic inversion algorithm (such as, surface wave analytic inversion), and generating a DNN model using the training dataset and the labels. The method then includes predicting property values corresponding to the survey data using the DNN model.

According to another embodiment, there is a seismic data processing apparatus having an interface configured to receive survey data acquired over an explored underground structure, and a data processing module connected to the interface. The data processing module is configured to generate a training dataset from the survey data, to obtain labels corresponding to the training dataset via an analytic inversion (such as surface wave analytic inversion), to generate a deep neural network, DNN, model using the training dataset and the labels, and to predict property values corresponding to the survey data using the DNN model.

According to yet another embodiment, there is a computer readable storing medium storing executable codes which, when executed by a computer make the computer perform a method for determining property values inside an explored underground structure. The method includes generating a training dataset representing survey data acquired over the explored underground structure, obtaining labels corresponding to the training dataset via an analytic inversion (such as, surface wave analytic inversion), and generating a DNN model using the training dataset and the labels. The method then includes predicting property values corresponding to the survey data using the DNN model.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data processing for exploring underground structures, in particular but not limited to SWI methods. However, these methods may be relevant also for gravitational or electromagnetic survey data processing.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

A hybrid analytics and machine learning (ML) approach for surface wave inverse (SWI) problems first inverts a training dataset using analytic optimization. This approach should not be considered limiting, rather the initial step is characterized by employing a physical model-based method, such as, inversion or analytic optimization. Then, a deep neural network (DNN) is trained using the training dataset and the inversion results. Finally, the trained DNN predicts shear-wave velocity values for the entire underground structure.

Figure 1:
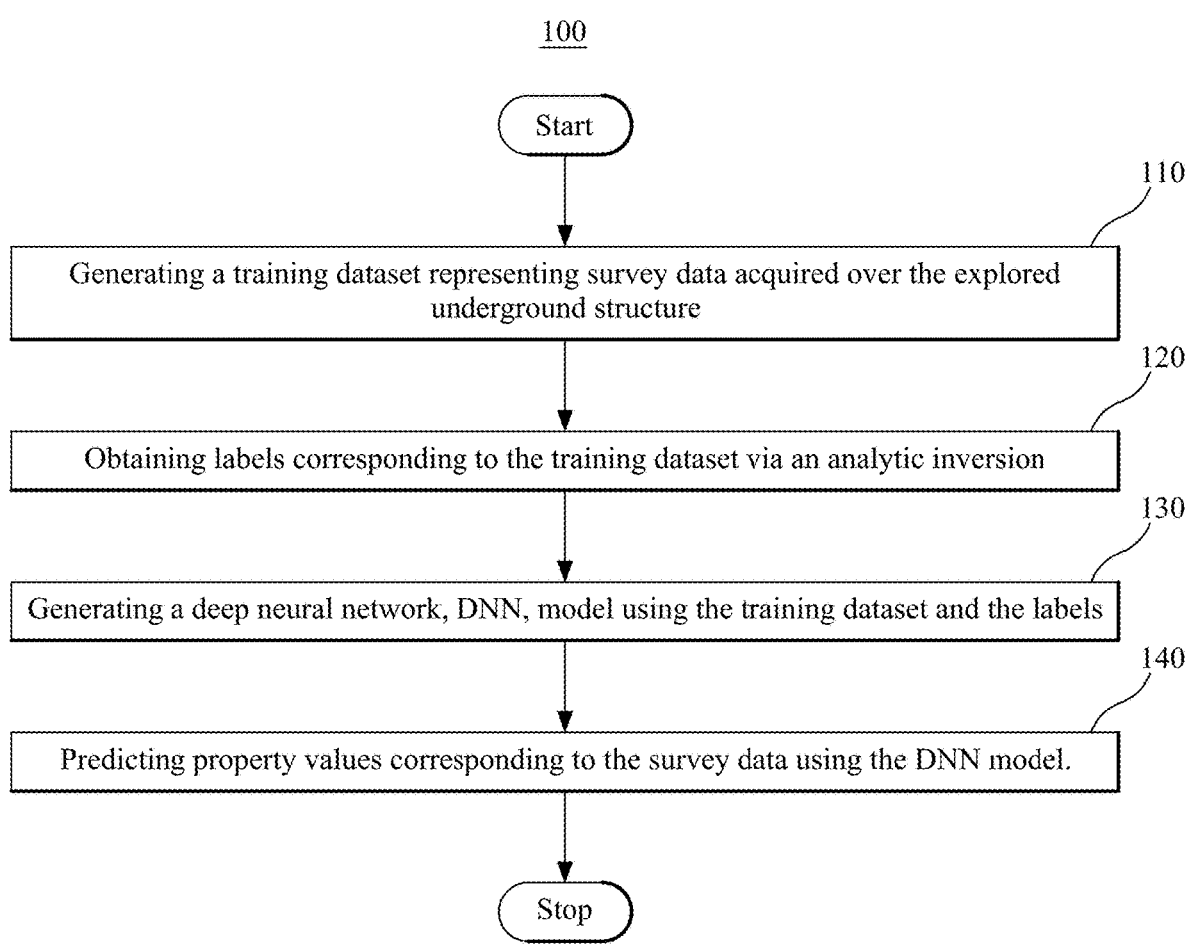
FIG. 1 is a flowchart of a method according to an embodiment.

FIG. 1 is a flowchart of a method 100 for property values inside an explored underground structure. Method 100 first includes generating a training dataset representing survey data acquired over the explored underground structure, at 110. The training dataset may be a subset of the survey data or may be otherwise obtained from the survey data (e.g., via interpolation at predetermined locations). The training dataset is selected so as to be representative as discussed later in this document. Note though that more than one training dataset may be used.

Method 100 then includes obtaining labels corresponding to the training dataset via an analytic inversion at 120 and generating a deep neural network (DNN) model using the training dataset and the labels. The term "label" is used for the output of the analytic inversion (e.g., a set of one-dimensional, 1D, shear-wave velocity curves). However, a label can be any set of property values, such as velocity, density, acoustic/elastic impedance and other lithology values.

The inverse problem can be solved at 120 using any of various known non-linear inversion methods, such as Monte Carlo, simulated annealing, etc. A deep neural network is a neural network with a certain level of complexity; for example, a neural network with more than one hidden layer. Generating the DNN model which determines model parameters for each layer is also known as training the DNN.

One embodiment uses SWI that estimates a 1D shear-wave velocity model m from the observed dispersion curves d. The relation between m and d can theoretically (for ideal data without noise or otherwise altered) be described by equation $f(m, d)=0$. In the analytic formulation of SWI, an optimal model $\hat{m}$ minimizes a misfit function $L=\|f(\hat{m}, d)\|$. The function is user determined and represents a physical model of the earth.

For a DNN (i.e., a neural network with multiple layers between the input and output, able to describe non-linear functions) the deep-learning SWI problem is written as $\hat{m}=g(d)$. Here g denotes the non-linear function which, after training, explicitly transforms the dispersion curves d to the predicted velocity model $\hat{m}$.

Figure 2:
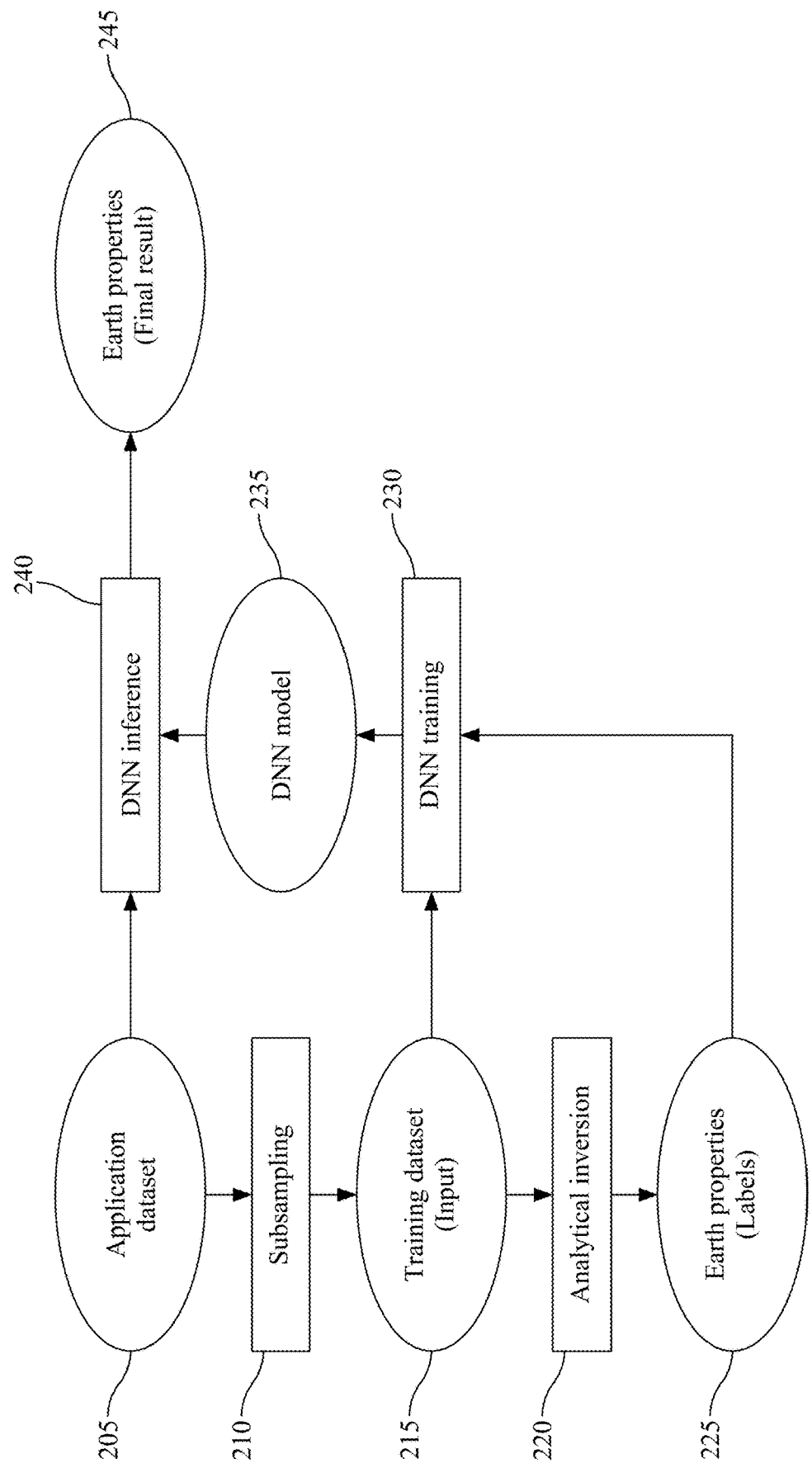
FIG. 2 is dataflow illustrating the hybrid analytic and machine learning approach.

FIG. 2 illustrates a three-step workflow according to an embodiment. The first step is a subsampling step 210 for preparing a training dataset 215, which is a selected or generated subset based on survey data 205. Survey data 205 may be seismic data acquired during a seismic survey over the explored underground formation. Analytic inversion methods are applied at 220 to the training dataset 215 for generating labels 225. In one embodiment, SWI is used to determine 1D shear-wave velocity curves (labels) based on some of the dispersion curves of surface waves.

In the second step 230, a DNN is trained using the training dataset 215 and labels 225. Optionally, transfer learning may be employed. That is, training the DNN may start with a pre-trained model as the starting point to speed up the training. In one embodiment, a DNN with three hidden layers is bunt and trained to minimize the loss function $L=\|\hat{m}-g(d)\|$.

The trained DNN operates according to a DNN model 235 during the third step 240 to predict property values 245 throughout the underground structure. This prediction (or feed-forward) step applies the DNN model to all datasets to predict various property values.

This approach (called hereinafter hybrid DNN) differs from conventional DNN method where a training set is created via repeated synthetic forward modeling over all possible parameter sets. Here, the training set is obtained from an analytic inversion on a subset of the dataset. The training dataset may be a coarsely sampled version of the entire dataset. The selection of the training dataset is performed so that the DNN model is representative of the underground formation to yield reliable forward predictions.

The hybrid DNN has the advantage of local training. By design, the methods limit the amount of data used for training. The prediction step is directed to the geological setting of the survey. Limiting the training dataset provides the advantage of requiring fewer DNN layers, simplifying the training and validation phase. A more generic DNN would require a big data approach, with more forward modeling and deeper DNN structure.

The training dataset may be selected in various ways, for example, by: (a) regularly subsampling the training dataset based on its spatial grid, or (b) subsampling the training dataset based on other features, such as geologies, acquisition, near surface.

One possible implementation of step 110/210 may include:
 i. classify the data to N classes based on geological features;
 ii. select M samples (gathers) from each class; and
 iii. use the M×N samples as the training dataset.

The "local training" may start with a pre-trained model from other project(s). This transfer learning approach speeds training convergence.

The hybrid DNN may be useful for various geophysical inverse problems and seismic processing. This approach has been tested on a real high-density land project. In comparison to the purely analytical approach, the hybrid analytic-ML method estimates a more reliable shear-wave velocity model over the entire surveyed underground structure with a significant reduction in computing time.

Both the analytic SWI and hybrid-ML approach have been applied to a land seismic dataset acquired using dynamite sources. Source and receiver stations were spaced 16 meters along their respective lines. The source lines were 192 m apart, whereas receiver lines were 160 m apart. The traces were therefore binned in an 8×8 meter common-midpoint (CMP) grid, yielding approximately 550,000 CMP locations.

As part of the data preparation for SWI, dispersion spectra were first computed using shot gathers. As a benchmarking reference, the analytic SWI was run for the entire dataset. The runtime of the non-linear SWI is directly proportional to the number of CMPs. Approximately 396,000 CPU node minutes have been used for the conventional analytic SWI. While the analytic SWI result overall seemed reasonable, in some areas, some acquisition footprints and anomalies that are not geologically plausible have been observed. These defects are likely caused by the noisy or abnormal input to SWI at the respective locations, because the inversions were performed at each location independently without any lateral smoothing or constraints.

For the hybrid DNN, analytic SWI on subsampled CMP locations was first performed, and then the input data and inversion results were used to train and build a DNN model. To study the sampling effect of the DNN result, two DNN models (A and B) were bunt using the same three-layer neural network architecture but different training datasets. Model A is trained using the analytic inversion result on a sparse 10×10 CMP grid, while model B is trained using analytic inversion on an even sparser 50×50 CMP grid. Since the analytic inversion is 1D, both training datasets were exactly the same, on the same CMP grid point, except model A used subsampled data that is 1% of the original full 550,000 grid points, while model B used subsampled data that is 0.04% of the original full 550,000 grid points.

The two DNN models have then been used to predict the inversion result for the whole dataset. The DNN A results are cleaner than that of analytic SWI and have sharper stratigraphy boundaries. Even though the DNN B has used 25 times fewer training samples than the DNN A, the DNN B results were very similar to those obtained with DNN A. The DNN B results deviated slightly farther from the full analytic SWI results than the DNN A results because the sampling of the training dataset is coarser. Nevertheless, both the footprints and anomalies observed in the analytic SWI results were not present in the DNN A results and the DNN B results.

Table 1 summarizes the performance of the hybrid DNN approach in terms of the computation time, the mean absolute error (MAE) and the mean absolute percentage error (MAPE) between the shear velocities predicted with the hybrid DNN and the analytic inversion, DNN A achieves 0.29% of MAPE and 1.24 m/s of MAE compared to the analytic result, while using ~1% of its runtime. Differences appear to be concentrated around areas where the analytic SWI struggles with footprints and anomalies. This implies that most of the 0.29% difference is due to improvements rather than errors. DNN B is an additional 25 times faster while the MAPE drops from 0.29% to 0.36%. Table 1 shows that nearly all of the runtime for the hybrid approach is used for preparing the training dataset with the analytic SWI. Time spent on training and prediction is negligible in comparison.

TABLE 1

| | Computation time (in node minutes) | | | | Error analysis | |
|---|---|---|---|---|---|---|
| | Analytic Inversion | Training | Prediction | Total | MAPE | MAE |
| Inversion | 396,000 | N/A | N/A | 396,000 | 0 | 0 |
| DNN A | 3,960 | 5 | 2 | 3,967 | 0.29% | 1.24 m/s |
| DNN B | 158.4 | 4 | 2 | 164.4 | 0.36% | 1.54 m/s |

Figure 3:
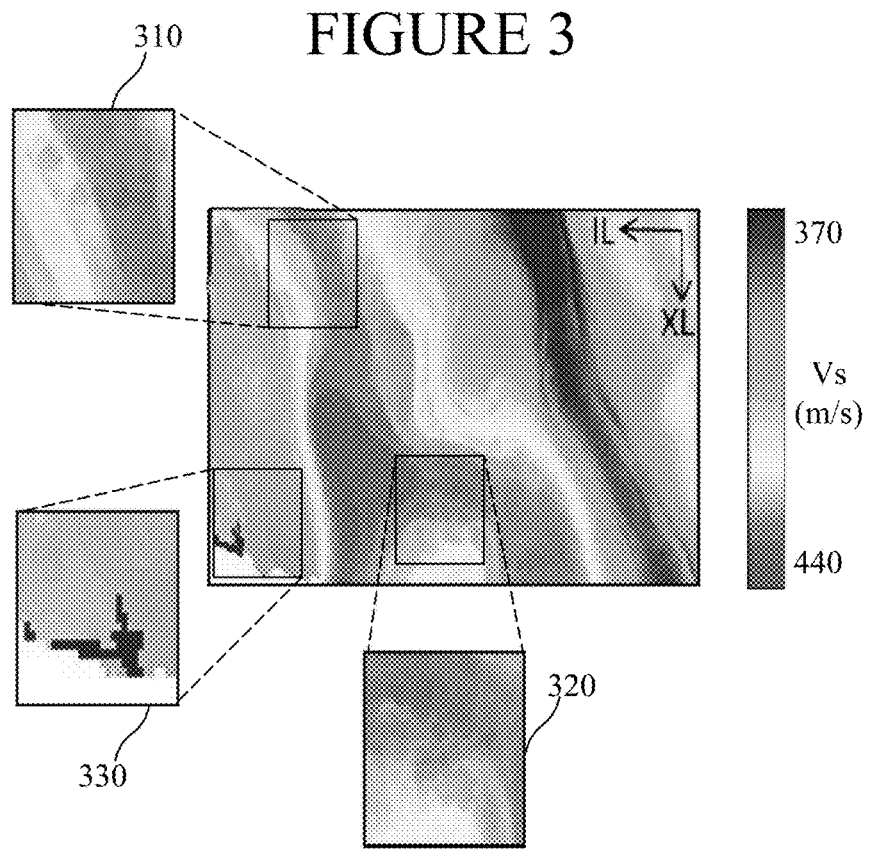
FIG. 3 is a map of shear-wave velocity values obtained using conventional analytic SWI, and three zoomed zones thereof.
Figure 4:
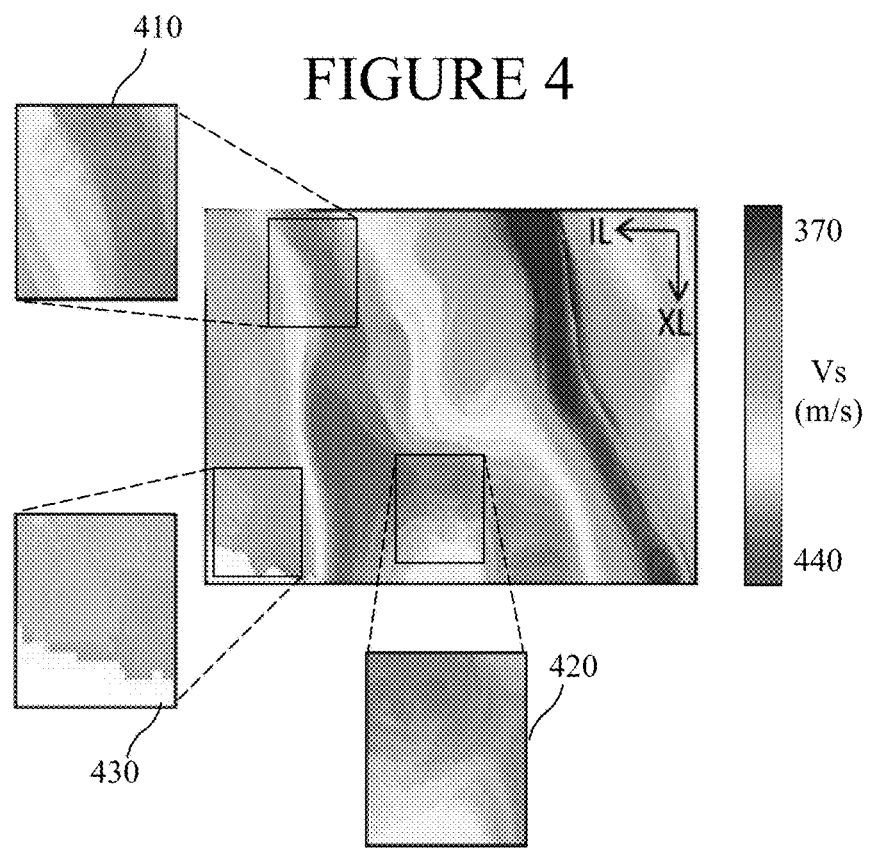
FIG. 4 is a map of shear-wave velocity values (and three zoomed zones thereof) obtained using a method according to an embodiment with a first training subset.
Figure 5:
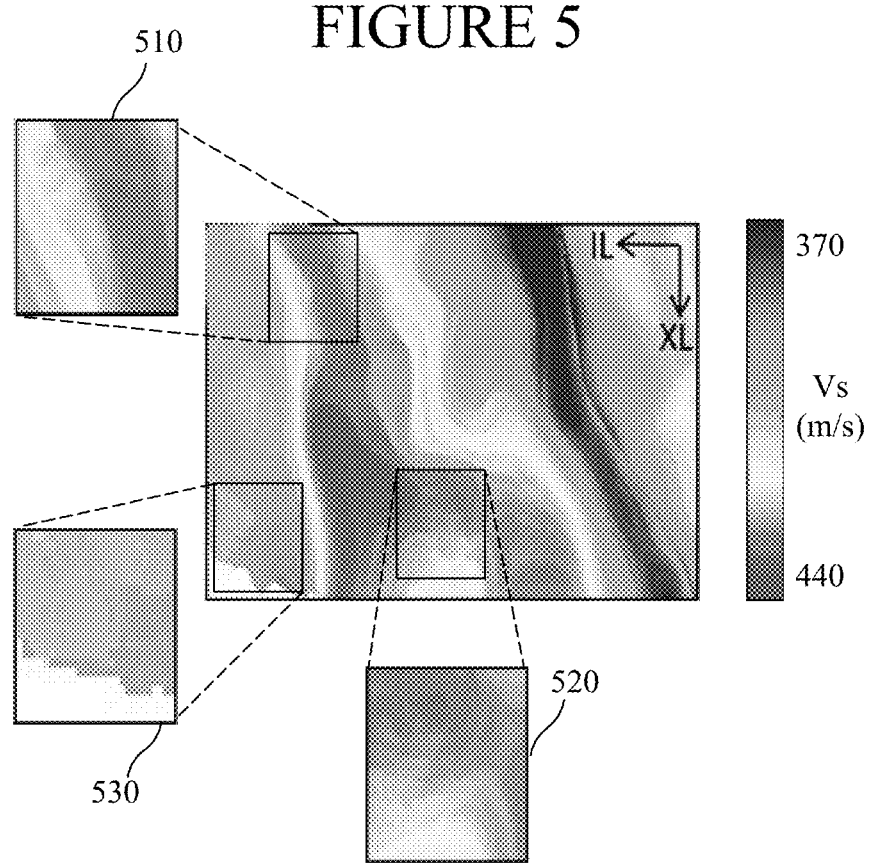
FIG. 5 is a map of shear-wave velocity values (and three zoomed zones thereof) obtained using a method according to an embodiment with a second training subset.

FIG. 3 illustrates a shear-wave velocity map (i.e., in a horizontal 4×5 km cross-section) at 75 m depth obtained using conventional analytic SWI. Zones 310, 320 and 330 are zoomed at the bottomSa. FIG. 4 illustrates a shear-wave velocity map for the same area obtained using model A, and FIG. 5 illustrates yet again a shear-wave velocity map for the same area obtained using model B (zones 410, 420, 430, 510, 520 and 530 being zoomed at the bottom, as in the case of FIG. 3). Comparison of these zoomed areas shows that the new approach illustrated in FIGS. 4 and 5 is less prone to outliers.

Figure 6:
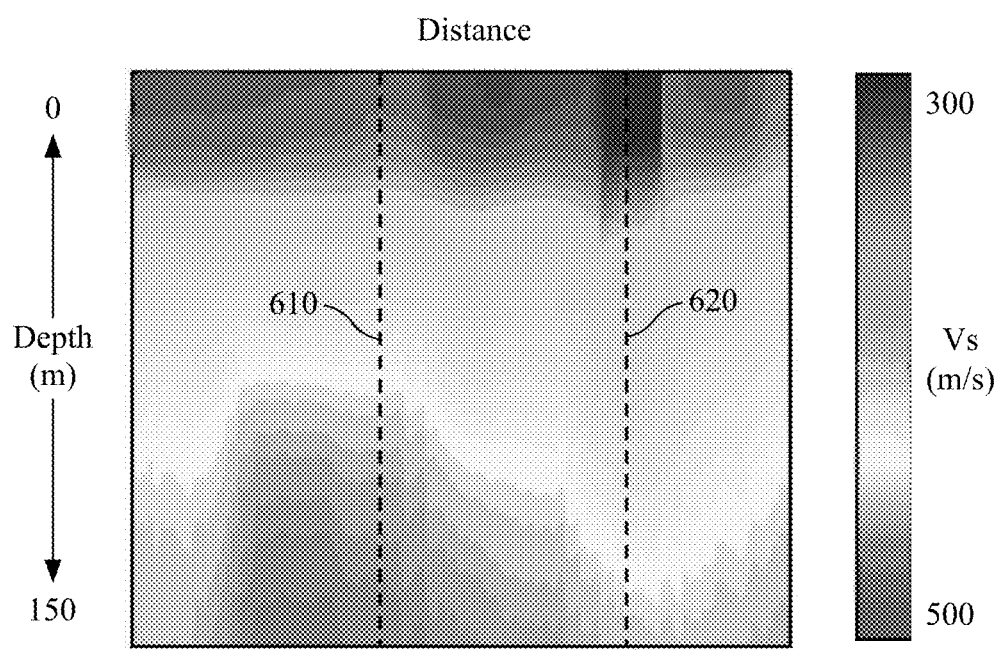
FIG. 6 is a two-dimensional vertical slice illustrating velocity values.
Figure 7:
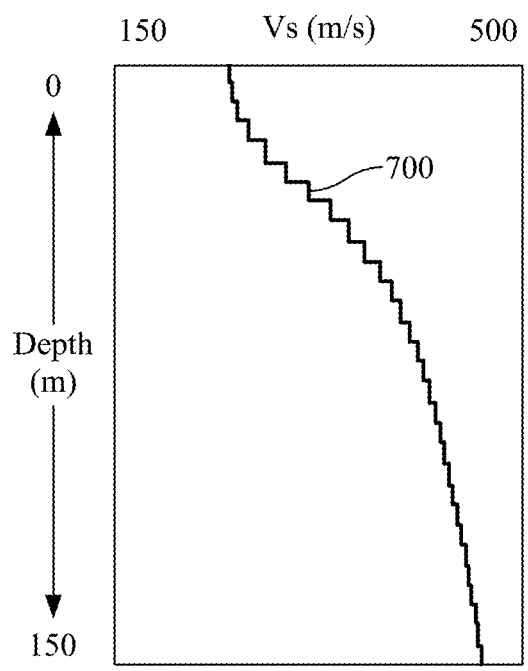
FIG. 7 is a graph illustrating velocity values obtained using conventional analytic SWI and a method according to an embodiment.
Figure 8:
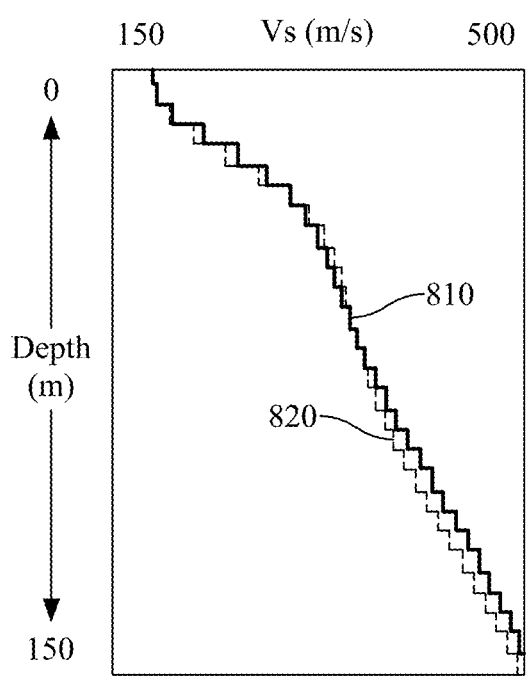
FIG. 8 is another graph illustrating velocity values obtained using conventional analytic SWI and the method according to an embodiment, respectively.

Further, for a vertical cross-section illustrated in FIG. 6, the shear-wave velocity values along cuts 610 and 620 are illustrated in FIGS. 7 and 8. Practically identical values (overlapping curves 700) are obtained with the conventional and the novel approach in FIG. 7, for a velocity range of about 250-450 m/s. The conventional analytic inversion results 810 are less accurate than the hybrid DNN results 820 in FIG. 8, for a velocity range of about 200-500 m/s.

The hybrid DNN approach is designed to replace conventional analytic inversion (based on knowledge of the forward operator) that optimizes a cost function based on statistical analysis using example data or past experience. In the absence of data from past experience, sample data is typically generated for conventional analytic inversion using a large set of synthetically forward modeled data. This conventional SWI inversion scenario entails generating a set of synthetics large enough to encompass all physically and geologically possible dispersion curves. Other types of analytic inversions may be employed and similarly statistically treated.

The hybrid DNN approach is characterized by using a selected subset of data in an analytic wave inversion to generate labels. Neither prior knowledge nor large-scale synthetics generation are necessary. However, the applicability of the DNN prediction based on the local geology is limited to the current survey. The hybrid DNN method simplifies the network structure, automates training and is more computationally efficient than building a universal DNN able to cope with all possible surface wave scenarios.

Figure 9:
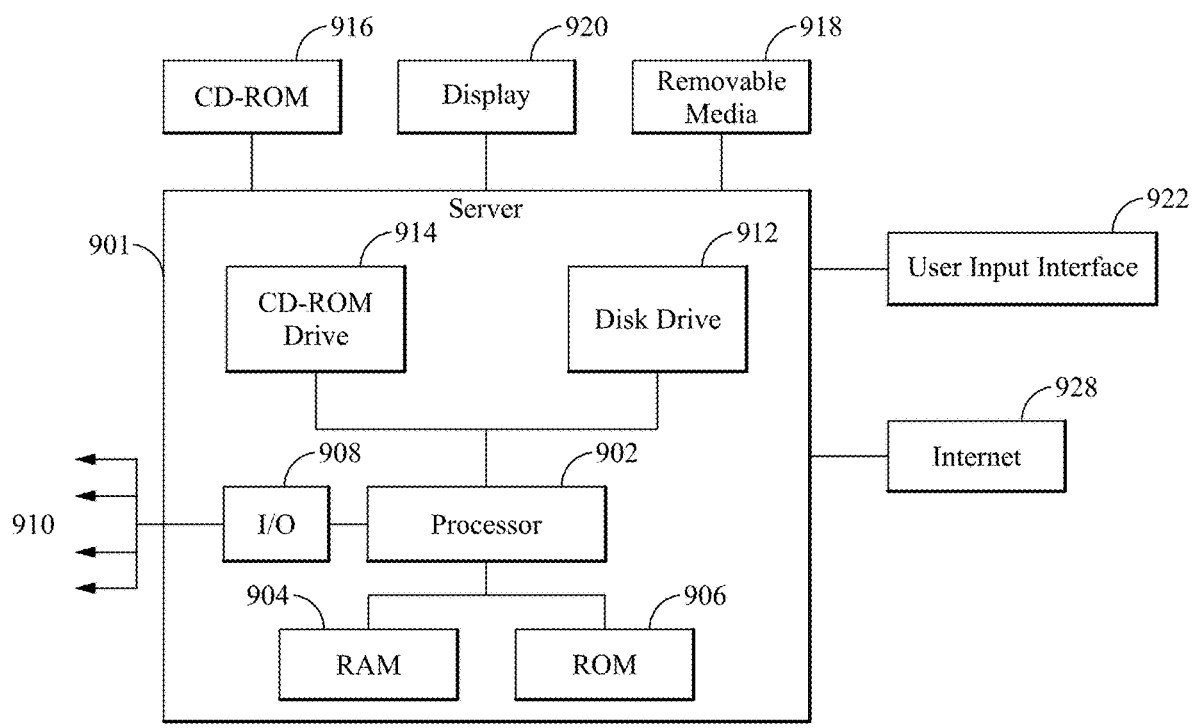
FIG. 9 is a block diagram of a seismic data processing apparatus according to an embodiment.

FIG. 9 shows a data processing apparatus 900 according to an embodiment. Data processing apparatus 900 suitable for performing the activities described in the exemplary embodiments may include a server 901. Server 901 may include a central processor (CPU) 902 coupled to a random-access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the internet 928, which allows ultimate connection to various computing devices.

According to one embodiment, I/O circuitry 908 is configured to receive survey data acquired over an explored underground structure (e.g., this circuitry may be connected to data acquisition equipment), and processor 902 is configured to generate a training dataset from the survey data, to obtain labels corresponding to the training dataset via a surface wave analytic inversion, to generate a deep neural network, DNN, model using the training dataset and the labels, and to predict property values corresponding to the survey data using the DNN model.

In yet another embodiment, RAM 904 stores executable codes that, when executed make the I/O circuitry 908 to receive survey data acquired over an explored underground structure (e.g., this circuitry may be connected to data collection equipment), and processor 902 to generate a training dataset from the survey data, to obtain labels corresponding to the training dataset via a surface wave analytic inversion, to generate a deep neural network, DNN, model using the training dataset and the labels, and to predict property values corresponding to the survey data using the DNN model.

The disclosed embodiments provide methods and systems for a hybrid DNN approach to determining property values inside an explored underground structure. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating property values inside an explored underground structure, the method comprising:
generating a training dataset representing survey data acquired over the explored underground structure, wherein the training dataset is generated by subsampling the survey data;
obtaining labels corresponding to the training dataset via a surface wave analytic inversion;
generating a deep neural network, DNN, model using the training dataset and the labels;
predicting property values corresponding to the survey data using the DNN model the property values being predicted throughout the explored underground structure to yield a property profile of one of density, acoustic/elastic impedance and shear velocity; and
determining presence of natural resources and drilling paths to the natural resources through the underground structure using the profile.

2. The method of claim 1, wherein the labels are dispersion curves d and the DNN model $\hat{m}$ minimizes a loss function $L=\|\hat{m}-g(d)\|$, where g is non-linear.

3. The method of claim 1, wherein the survey data is regularly subsampled based on a spatial grid to generate the training dataset.

4. The method of claim 1, wherein the survey data is subsampled taking into consideration geological features of the explored underground structure.

5. The survey method of claim 4, wherein the survey data is grouped in N classes based on the geological features, and the training dataset includes M samples for each of the N classes.

6. The survey method of claim 1, wherein the surface wave analytic inversion includes a stochastic optimization.

7. The method of claim 1, wherein the property values are shear-wave velocity values and the analytic inversion is a surface wave inversion yielding one-dimensional shear-wave velocity curves.

8. A seismic data processing apparatus, comprising:
   an interface configured to receive survey data acquired over an explored underground structure; and
   a data processing module connected to the interface and configured
      to generate a training dataset from the survey data, wherein the training dataset is generated by subsampling the survey data;
      to obtain labels corresponding to the training dataset via a surface wave analytic inversion;
      to generate a deep neural network, DNN, model using the training dataset and the labels;
      to predict property values corresponding to the survey data using the DNN model, the property values being predicted throughout the explored underground structure to yield a property profile of one of density, acoustic/elastic impedance and shear velocity; and
      to determine presence of natural resources and drilling paths to the natural resources using the profile.

9. The seismic data processing apparatus of claim 8, wherein the labels are dispersion curves d and the DNN model $\hat{m}$ minimizes a loss function $L=\|\hat{m}-g(d)\|$, where g is a non-linear function.

10. The seismic data processing apparatus of claim 8, wherein the data processing module subsamples the survey data regularly, based on a spatial grid, to generate the training dataset.

11. The seismic data processing apparatus of claim 8, wherein the data processing module subsamples the survey data taking into consideration geological features of the explored underground structure.

12. The seismic data processing apparatus of claim 11, wherein the data processing module groups the survey data in N classes based on the geological features and generates the training dataset to include M samples for each of the N classes.

13. The seismic data processing apparatus of claim 8, wherein the surface wave analytic inversion includes a stochastic optimization.

14. The seismic data processing apparatus of claim 8, wherein the property values are shear-wave velocity values and the analytic inversion is a surface wave inversion yielding one-dimensional shear-wave velocity curves.

15. A non-transitory computer readable storing medium storing executable codes which, when executed by a computer make the computer perform a method for determining property values inside an explored underground structure, the method comprising:
   generating a training dataset from survey data acquired over the explored underground structure, wherein the training dataset is generated by subsampling the survey data;
   obtaining labels corresponding to the training dataset via a surface wave analytic inversion;
   generating a deep neural network, DNN, model using the training dataset and the labels;
   predicting property values corresponding to the survey data using the DNN model, the property values being predicted throughout the explored underground structure to yield a property profile of one of density, acoustic/elastic impedance and shear velocity; and
   determining presence of natural resources and drilling paths to the natural resources using the profile.

16. The non-transitory computer readable storing medium of claim 15, wherein the labels are dispersion curves d and the DNN model $\hat{m}$ minimizes a loss function $L=\|\hat{m}-g(d)\|$, where g is a non-linear function.

17. The non-transitory computer readable storing medium of claim 15, wherein the training dataset is generated by subsampling the survey data regularly, based on a spatial grid.

18. The non-transitory computer readable storing medium of claim 17, wherein the property values are shear-wave velocity values and the analytic inversion is a surface wave inversion yielding one-dimensional shear-wave velocity curves.

* * * * *